United States Patent [19]

Overhoff et al.

[11] Patent Number: 5,386,861
[45] Date of Patent: Feb. 7, 1995

[54] TREAD PATTERN FOR VEHICLE TIRE

[75] Inventors: Dietrich Overhoff, Gross-Umstadt; Otto Sallein, Breuberg/Odenwald, both of Germany

[73] Assignee: Pirelli Reifenwerke GmbH, Hoechst/Odenwald, Germany

[21] Appl. No.: 980,772

[22] Filed: Nov. 24, 1992

[30] Foreign Application Priority Data

Nov. 25, 1991 [DE] Germany ............... 4138688

[51] Int. Cl.⁶ ............................................. B60C 11/11
[52] U.S. Cl. ........................ 152/209 R; 152/DIG. 3
[58] Field of Search ........... 152/209 R, 209 A, 209 D, 152/DIG. 3; D12/146, 147

[56] References Cited

U.S. PATENT DOCUMENTS

| D. 336,069 | 6/1993 | White | D12/147 |
| D. 344,050 | 2/1994 | Overhoff et al. | D12/147 |
| 4,926,919 | 5/1990 | Hopkins et al. | 152/209 R |

FOREIGN PATENT DOCUMENTS

| 3943014 | 6/1990 | Germany | 152/209 R |
| 4019386 | 1/1991 | Germany | 152/209 R |
| 0223006 | 9/1989 | Japan | 152/209 D |
| 0031902 | 2/1990 | Japan | . |
| 3079407 | 4/1991 | Japan | 152/209 D |
| 3178810 | 8/1991 | Japan | 152/209 D |
| 3208709 | 9/1991 | Japan | . |
| 4087806 | 3/1992 | Japan | . |
| 4197807 | 7/1992 | Japan | 152/209 D |

Primary Examiner—Michael W. Ball
Assistant Examiner—Nancy T. Krawczyk
Attorney, Agent, or Firm—Herbert L. Lerner; Laurence A. Greenberg

[57] ABSTRACT

A tread pattern for a vehicle tire has at least one circumferential longitudinal groove as well as transverse grooves starting from the longitudinal groove and defining tread blocks between the transverse grooves limiting the longitudinal groove laterally. In order to improve the transmission of driving and braking forces, the tread blocks each have a projection along the longitudinal groove at the center of the sidewalls of the tread blocks, extending from the tread surface to the bottom of the longitudinal groove.

5 Claims, 2 Drawing Sheets

5,386,861

TREAD PATTERN FOR VEHICLE TIRE

SPECIFICATION

The invention relates to a tread pattern or profile for a vehicle tire with at least one circumferential longitudinal groove as well as transverse grooves starting from the longitudinal groove and defining tread blocks between the transverse grooves laterally limiting the longitudinal groove.

With such a tread pattern structure, the longitudinal groove is decisive for lateral stability and for the avoidance of aquaplaning of the tire, while the transverse grooves ensure a better transmission of traction, braking and those forces which are generated by and act in curves. The transverse grooves could run perpendicularly or diagonally relative to the circumferential longitudinal groove. In addition, the tread blocks, especially in the case of winter tires, may be provided with fine sipes for enhanced gripping.

Mainly transverse tread edges come into contact with the ground, essential for the transmission of the traction and braking forces. However, excessive splitting-up of the tread pattern by transverse grooves is restricted by structural limitations.

It is accordingly an object of the invention to provide a tread pattern for a vehicle tire, which overcomes the hereinafore-mentioned disadvantages of the heretofore-known products of this general type and which improves the transmission of traction and braking forces.

With the foregoing and other objects in view there is provided, in accordance with the invention, a tread pattern for a vehicle tire, comprising a tire body having a tread surface; at least one circumferential longitudinal groove being formed in the tire body and defining a bottom of the longitudinal groove; transverse grooves extending from the longitudinal groove in the tire body and defining tread blocks between the transverse grooves; the tread blocks having sidewalls limiting the longitudinal groove laterally, and the tread blocks having projections extending from the sidewalls into the longitudinal groove, from the tread surface to the bottom of the longitudinal groove.

Due to these projections into the longitudinal groove which do not extend over the entire length of a tread block, additional transverse traction and braking edges are obtained at the cutbacks which are thus formed with respect to the normal longitudinal-groove width, enabling a better transmission of the corresponding forces.

In accordance with another feature of the invention, each of the projections has a length of approximately ½ to ¾ of the length of one of the tread blocks, as seen along the longitudinal groove.

In accordance with a further feature of the invention, the projections are disposed centrally with respect to the tread blocks, but different configurations would also be possible.

In accordance with an added feature of the invention, the projections have a maximum width of ¼ of the width of the longitudinal groove.

In accordance with an additional feature of the invention, the sidewalls of the longitudinal groove have a substantially V-shaped cross section with a given angle of inclination, and the projections have inner sidewalls with angles of inclination being smaller than the given angle of inclination.

In accordance with yet another tread surface has sipes extending into the projections.

In accordance with yet a further feature of the invention, the projections are main projections having inner sidewalls, and the main projections have sub-projections extending from the inner sidewalls and expanding in a V-shape towards the bottom of the longitudinal groove, the sub-projections having a saw-tooth-like graduation as seen in circumferential direction of the longitudinal groove. This is done in order to create additional edges for the transmission of the corresponding forces.

In accordance with yet an added feature of the invention, the saw-tooth-like graduations have saw-tooth tips with a given angle of inclination, and the sidewalls of the longitudinal groove have the given angle of inclination.

In accordance with a concomitant feature of the invention, the main projections have upper edges being flush with the sub-projections.

These additional edges and transverse surfaces offer particular advantages, e.g. when driving through deep snow, so that a tire with this tread pattern structure could be further optimized.

Other features which are considered as characteristic for the invention are set forth in the appended claims.

Although the invention is illustrated and described herein as embodied in a tread pattern for a vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
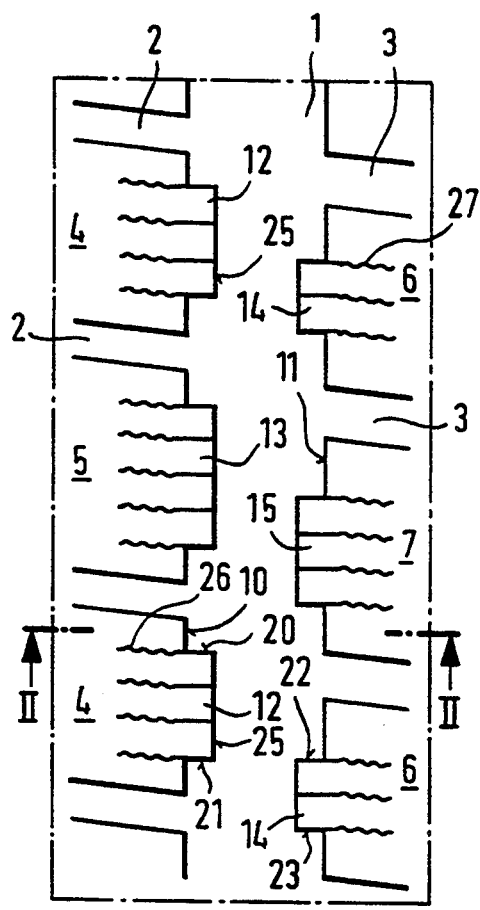
FIG. 1 is a fragmentary, diagrammatic, plan view of a tread section within the region of a longitudinal groove, with projections.

Referring now to the figures of the drawing in detail and first, particularly, to FIG. 1 thereof, there is seen a tread section within the region of a circumferential longitudinal groove 1 in a tire body shown in phantom lines, with transverse grooves 2 extending to one side and transverse grooves 3 extending towards the opposite side in the tire body, which are advantageously offset from one another. Enclosed by these transverse grooves 2 and 3 are tread blocks 4 and 5 on the one side, and tread blocks 6 and 7 on the other side. A is indicated by the different numbering, the tread blocks may also have different lengths parallel to longitudinal groove 1.

Figure 2:
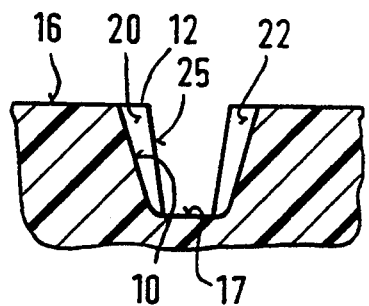
FIG. 2 is a fragmentary, cross-sectional view of the tread according to FIG. 1, which is taken along the line II—II of FIG. 1, in the direction of the arrows.

According to the example shown, the tread blocks 4, 5 and 6, 7 have respective sidewalls 10 and 11. The sidewalls 10 and 11 have respective central regions along the longitudinal groove 1 with respective projections 12, 13 and 14, 15 that reach into the longitudinal groove 1 and extend from a tread surface 16 down to a bottom 17 of the longitudinal groove 1, as may be noted from the cross section in FIG. 2, which is taken along the line II—II of FIG. 1.

These respective projections 12, 13 and 14, 15 form additional transverse edges 20, 21 and 22, 23 at cutbacks to the respective tread blocks 4, 5 and 6, 7 proper, which enable the transmission of traction and braking forces, in addition to the edges limiting the transverse grooves 2.

The length of any of the respective projections 12, 13 and 14, 15 should be about ½ to ¾ of the length of any of the tread blocks 4, 5 or 6, 7. In the case of the longer tread blocks 5 and 7, the corresponding projections 13 and 15 may have lengths which are increased accordingly. The maximum width of a projection is ¼ of the width of the longitudinal groove 1.

However, a different configuration of the projections from the tread blocks, i.e. one which is off-center or split up, would be possible as well.

Usually, the sidewalls 10 of the longitudinal groove 1 form a downward pointing "V". However, a corresponding sidewall 25 of the projection 12 which is such a projection, may have a smaller angle of inclination than the sidewall 10 of the longitudinal groove 1, in particular in the case of relatively narrow longitudinal grooves. Additionally, a different angle ratio may be possible in wider longitudinal grooves.

In addition, this tread pattern includes fine sipes 26 and 27 which extend into the respective projections the 12, 13 and 14, 15.

Figure 5:
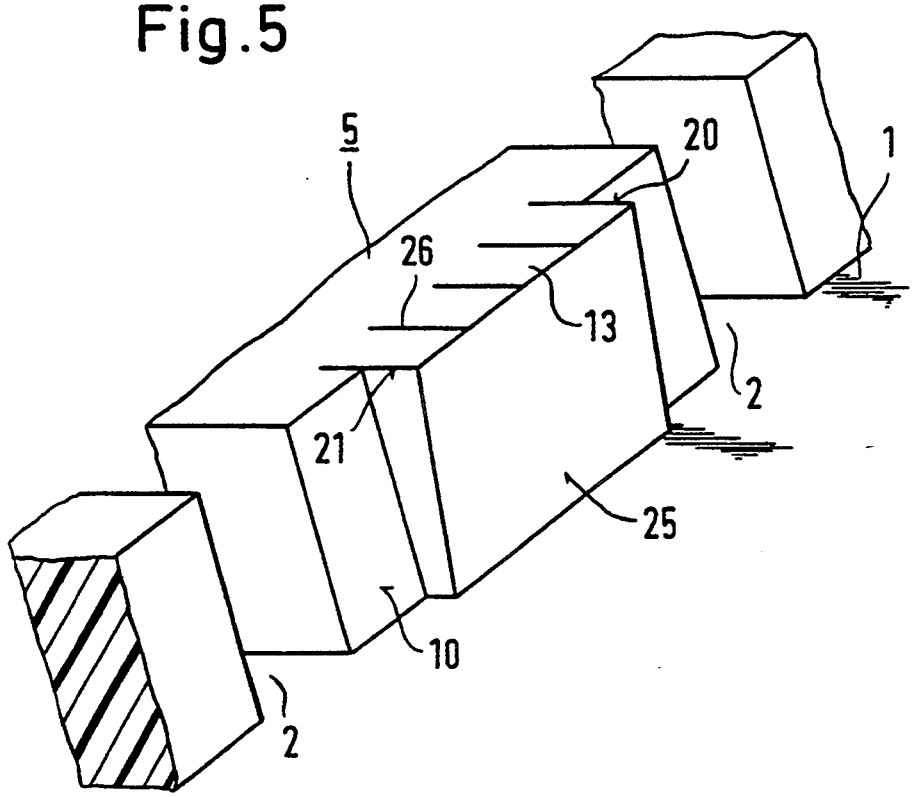
FIG. 5 is an enlarged, fragmentary, perspective view of a tread pattern structure corresponding to FIG. 1.

In order to provide a better illustration, FIG. 5 shows a perspective view of the sidewall 10 along the longitudinal groove 1, e.g. of the tread block 5 limited by its transverse grooves 2, as well as the projection 13 extending into the longitudinal groove 1, creating the corresponding transverse edges 20 and 21.

Figure 3:
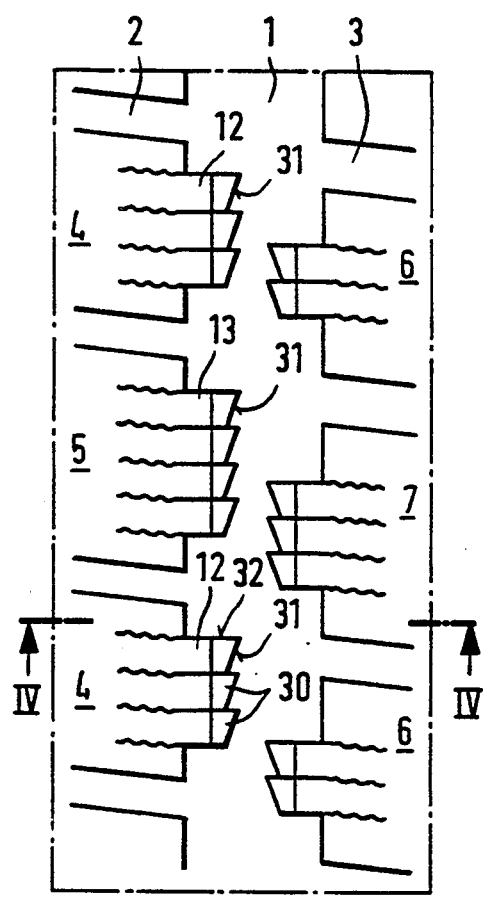
FIG. 3 is a view-similar to FIG. 1 of a tread section within the region of a longitudinal groove with additional saw-tooth-like sub-projections from main projections.
Figure 4:
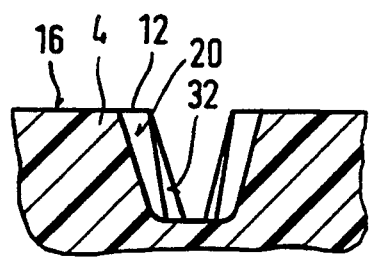
FIG. 4 is a fragmentary, cross-sectional view of the tread according to FIG. 3, which is taken along the line IV—IV of FIG. 3, in the direction of the arrows.

As already indicated, an essential feature of the invention is the formation of additional transverse edges for the better transmission of the corresponding forces. As may be noted from FIG. 3, 4 and 6 in particular, additional structural measures may produce further desirable effects. The respective main projections 12, 13 and 14, 15 have additional sub-projections 30 on their inner sidewalls 25, extending in V-shape towards the bottom of the longitudinal groove, with a saw-tooth-like graduation along the longitudinal direction of the longitudinal groove 1 in the form of surfaces 31 that are inclined accordingly.

Figure 6:
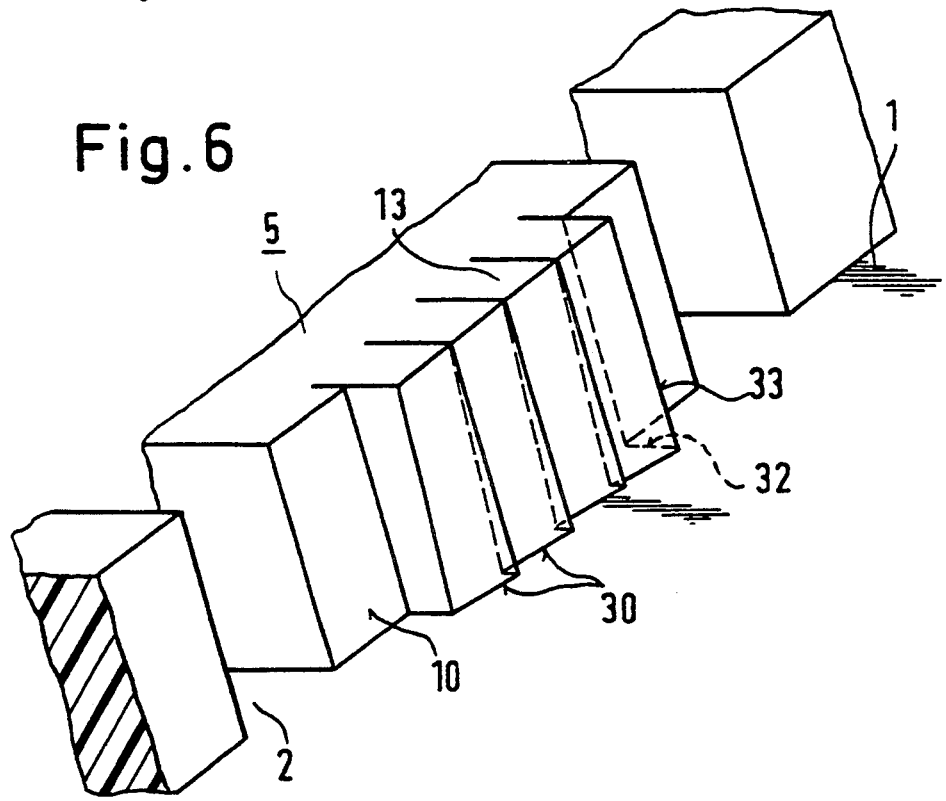
FIG. 6 is a perspective view of a tread pattern structure corresponding to FIG. 3.

This is very clearly shown by the perspective view according to FIG. 6. The sub-projections 30 may start flush from the upper edge of the main projection 13, extending in V-shape and with saw-tooth-like graduation towards the bottom of the groove, thus forming additional edges 32 as is indicated in broken lines in FIG. 6. Saw-tooth tips 33 of the various sub-projections 30 may advantageously have the same angle of inclination as the sidewalls 10 of the longitudinal groove.

However, these sub-projections may also be disposed in diagonal transverse grooves, although that is not illustrated separately in the drawing.

With the additional transverse edges 32 being formed in this way and expanding towards the bottom of the longitudinal groove, effective areas and edges are added to improve the transmission of traction and braking forces, in particular when driving in deep snow.

The above essentially describes the basic principle of such an additional tread pattern structure. Of course, structural changes with respect to tread block size, course and configuration of transverse grooves, size, depth and number of longitudinal grooves are possible without abandoning the basic idea of the invention.

We claim:

1. A tire with a tread, comprising:
  a tire body having a tread surface;
  at least one circumferential longitudinal groove formed in said tire body;
  transverse grooves extending from said longitudinal groove in said tire body and defining tread blocks between said transverse grooves;
  said tread blocks having sidewalls limiting said longitudinal groove laterally;
  projections formed on said tread blocks and projecting into said longitudinal groove, each of said projections being formed centrally with respect to said tread blocks, having a projection length of approximately ½ to ¾ of the length of one of said tread blocks, and have transverse edges extending perpendicularly away from said sidewalls of said tread blocks; and
  said tread surface of said tread blocks having sipes cut therein extending across said projections to a front edge of said projections; and
  wherein said projections are main projections having inner sidewalls, and said main projections have sub-projections extending from said inner sidewalls and expanding in a V-shape towards a bottom of said longitudinal groove, said sub-projections having a saw-tooth-like graduation as seen in circumferential direction of said longitudinal groove.

2. The tire according to claim 1, wherein said projections have a maximum width of ¼ of the width of said longitudinal groove.

3. The tire according to claim 1, wherein said sidewalls of said longitudinal groove have a substantially V-shaped cross section with a given angle of inclination relative to a vertical pointing towards a center of the tire, and said projections have inner sidewalls with angles of inclination being smaller than said given angle of inclination.

4. The tire according to claim 1, wherein said saw-tooth-like graduations have saw-tooth tips with a given angle of inclination, and said sidewalls of said longitudinal groove have said given angle of inclination.

5. The tire according to claim 1, wherein said main projections have upper edges being flush with said sub-projections.

* * * * *